United States Patent [19]

Hachiya et al.

[11] Patent Number: 6,096,242
[45] Date of Patent: Aug. 1, 2000

[54] LIQUID CRYSTAL COMPOSITIONS AND LIQUID CRYSTAL DISPLAY ELEMENTS

[75] Inventors: Norihisa Hachiya, Yashio; Yasusuke Hisatsune, Ichihara; Fusayuki Takeshita; Tetsuya Matsushita, both of Sodegaura; Etsuo Nakagawa, Ichihara, all of Japan

[73] Assignee: Chisso Corporation, Osaka, Japan

[21] Appl. No.: 09/039,390

[22] Filed: Mar. 16, 1998

[51] Int. Cl.$^7$ .......................... C09K 19/52; C09K 19/34; C09K 19/30
[52] U.S. Cl. ............................. 252/299.01; 252/299.61; 252/299.63; 252/299.66; 252/299.67
[58] Field of Search ................. 252/299.01, 299.61, 252/299.63, 299.66, 299.67

[56] References Cited

U.S. PATENT DOCUMENTS 4,528,114  7/1985  Petrzilka .............................. 252/299.6

FOREIGN PATENT DOCUMENTS 59-139353   8/1984   Japan.
59-190958  10/1984   Japan.
60-19756    1/1985   Japan.
WO 97/36847 10/1997  WIPO.

OTHER PUBLICATIONS

WPIDS 1997–503016.
CAPLUS 1997–679042.
T.J. Scheffer, et al., "A New, Highly Multiplexable Liquid Crystal Display", Appl. Phys. Lett. vol. 45, No. 10, Nov. 15, 1984, pp. 1021–1023.

Primary Examiner—Shean C. Wu
Attorney, Agent, or Firm—Oblon, Spivak, McClelland, Maier & Neustadt, P.C.

[57] ABSTRACT

Liquid crystal compositions comprising at least two components wherein the first component is at least one selected from propiolonitrile derivatives containing 2–4 rings and the second component is at least one selected from the liquid crystalline compounds containing 2–4 rings and a saturated or unsaturated hydrocarbon group of up to 10 carbons. The propiolonitrile derivatives of the first component are those wherein each ring is trans-1,4-cyclohexylene, 1,4-phenylene, 2,6-dioxan-1,4-diyl or 2,6-pyrimidine-1,4-diyl, each bridge between the rings is ethylene, carbonyloxy or covalent bond and the terminal group at one end is hydrocarbon group of up to 10 carbons which may contain at least one ether bond in the chain.

25 Claims, No Drawings

LIQUID CRYSTAL COMPOSITIONS AND LIQUID CRYSTAL DISPLAY ELEMENTS

FIELD OF THE INVENTION

This invention relates to a new nematic liquid crystal composition and a liquid crystal display element using said composition. More specifically, the invention relates to a liquid crystal composition suitable for a supertwisted birefringence (STN) mode and a liquid crystal display element using said composition.

BACKGROUND OF THE INVENTION

A twisted nematic (TN) mode, a supertwisted birefringence (STN) mode, an active matrix (AM-LCD) mode and the like have been suggested and put to practical use as a display mode for a liquid crystal display element (LCD). Among them, a supertwisted birefringence (STN) mode in which the orientations of liquid crystal molecules on the upper and lower substrates are twisted to 180–270° (T. J. Scheffer et al.: Appl. Phy. Lett., 45(10), 1021(1984)) is adopted as LCD for personal computers, word processors or the like. More improvement in characteristics have been demanded.

A liquid crystal composition for the liquid crystal display element of the STN mode is required to have the following characteristics:

(1) To show a nematic liquid crystal phase in a wide range of temperature including room temperature, and especially having a high nematic-isotropic phase transition temperature (clearing point).

(2) To have a low threshold voltage in order to reduce a consumed power.

(3) To have a low viscosity ($\eta$) in order to reduce a response rate ($\tau$) as low as possible.

(4) To be able to take a suitable optical anisotropy ($\Delta n$) in compliance with a liquid crystal display element.

(5) To have a steep voltage-transmittance in order to raise the contrast of a liquid crystal display element, that is, to have a low $\gamma$ ($V_{10}/V_{90}$).

Recently, there has been a strong demand for the response of LCD to animations. To respond to animations, a response rate at which LCD is driven should be low. As a response rate is proportional to the viscosity of a liquid crystal composition, a liquid crystal composition having a low viscosity has been required to develop.

As a battery-drive of LCD has become possible, LCD for outdoor use has been developed. To ensure the outdoor use, the range of a nematic liquid crystal phase is required to broaden.

Japanese Patent Kokai 60-19756, 59-190958 and 59-139353 disclose liquid crystal compositions comprising propiolonitrile derivatives, but those compositions contain only liquid crystalline compounds having a positive or weak negative anisotropy of the dielectric constants and have a relatively high viscosity, thus having a slow response rate.

Moreover, the above publications do not disclose the constitutional components and its mixed ratio of the liquid crystal compositions which are required for their characteristics.

Accordingly, there is a continuing need for an improved liquid crystal composition.

SUMMARY OF THE INVENTION

An object of the present invention is to provide a liquid crystal composition having a high clearing point and low viscosity and low response rate $\tau$, especially to cope with an outdoor use and high response rate, while satisfying various characteristics required for the above STN mode.

Through our intensive studies on compositions using various liquid crystal compounds to solve the above-mentioned problems, we have found that liquid crystal compositions comprising propiolonitrile derivatives having a positive or weak negative anisotropy of the dielectric constants and compounds having a negative or weak positive anisotropy of the dielectric constants, and liquid crystal compositions comprising compounds having a large positive anisotropy of the dielectric constants are able to exhibit highly superior characteristics for STN display element.

DETAILED DESCRIPTION OF THE INVENTION

The invention provides a liquid crystal composition comprising at least two components, in which the first component is at least one selected from the compounds of formula (1)

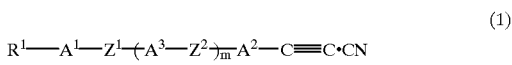

(1)

wherein m is 0 or 1; each of $A^1$, $A^2$ and $A^3$ represents a 6-membered ring; each of $Z^1$ and $Z^2$ represents a bridge between the rings; and $R^1$ represents a terminal group selected from a straight or branched hydrocarbon group of 1–10 carbons which may contain one or more ether bonds (—O—) in the chain; which include (a) a bicyclic compound wherein m is 0; ring $A^1$ is trans-1,4-cyclohexylene, 1,4-phenylene, 2,6-dioxan-1,4-diyl or 2,6-pyrimidine-1,4-diyl, in which the carbon atom in the ring bound to bridge $Z^1$ is defined as 1-position; ring $A^2$ is trans-1,4-cyclohexylene or 1,4-phenylene; and bridge $Z^1$ is ethylene (—CH$_2$CH$_2$—), carbonyloxy (—COO—) or a covalent bond (—); and (b) a tricyclic compound wherein m is 1; rings $A^1$, $A^2$ and $A^3$ are each independently trans-1,4-cyclohexylene or 1,4-phenylene; bridge $Z^1$ is a covalent bond (—); and bridge $Z^2$ is ethylene (—CH$_2$CH$_2$—) or a covalent bond (—);

and the second component is at least one selected from the compounds of formula (2)

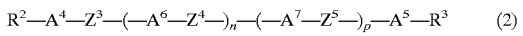

(2)

wherein n and p are each independently 0 or 1; each of $A^4$, $A^5$, $A^6$ and $A^7$ represents a six-membered ring; each of $Z^3$, $Z^4$ and $Z^5$ represents a bridge between the rings; and both $R^2$ and $R^3$ represent a terminal group; which include (a) a bicyclic compound wherein n and p are 0; ring $A^4$ is trans-1,4-cyclohexylene, 1,4-phenylene or 2,6-pyrimidine-1,4-diyl, in which the carbon atom in the ring bound to bridge $Z^3$ is defined as 1-position; ring $A^5$ is trans-1,4-cyclohexylene or 1,4-phenylene; bridge $Z^3$ is ethynylene, ethenylene (—CH=CH—), ethylene (—CH$_2$CH$_2$—), carbonyloxy (—COO—) or a covalent bond (—); and $R^2$ and $R^3$ are each independently a straight or branched, saturated or unsaturated hydrocarbon group of up to 10 carbons which may contain one or more ether bonds (—O—) in the chain and wherein one or more H's may be substituted by F;

(b) a tricyclic compound wherein n is 1; p is 0; ring $A^4$ is trans-1,4-cyclohexylene or 2,6-pyrimidine-1,4-diyl, in which the carbon atom in the ring bound to $Z^3$ is defined as 1-position; ring $A^5$ is trans-1,4-cyclohexylene or 1,4-phenylene; ring $A^6$ is trans-1,4-cyclohexylene or 1,4-phenylene which may be substituted by one or more F's;

bridge $Z^3$ is ethylene (—$CH_2CH_2$—), ethenylene (—CH=CH—), carbonyloxy (—COO—) or a covalent bond (—); bridge $Z^4$ is ethynylene, ethenylene (—CH=CH—), carbonyloxy (—COO—) or a covalent bond (—); and $R^2$ and $R^3$ are each independently a straight or branched, saturated or unsaturated hydrocarbon group of up to 10 carbons which may contain one or more ether bonds (—O—) in the chain and in which one or more H's may be substituted by F; and (c) a tetracyclic compound wherein n and p are 1; rings $A^4$ and $A^5$ are trans-1,4-cyclohexylene; ring $A^6$ is 1,4-phenylene in which the adjacent position to the carbon atom bound to $Z^4$ may be substituted by F; ring $A^7$ is 1,4-phenylene; any of bridges $Z^3$, $Z^4$ and $Z^5$ is a covalent bond (—); and $R^2$ and $R^3$ are independently a straight or branched, saturated or unsaturated hydrocarbon group of up to 10 carbons.

The liquid crystal composition according to the present invention may further comprise as the third component at least one selected from the compounds of formula (3)

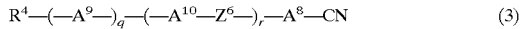

$$R^4—(—A^9—)_q—(—A^{10}—Z^6—)_r—A^8—CN \qquad (3)$$

wherein q and r are independently 0 or 1, and the sum of q+r is at least 1; each of $A^8$, $A^9$ and $A^{10}$ is a 6-membered ring; $Z^6$ represents a bridge between the rings; and $R^4$ is a straight or branched, saturated or unsaturated hydrocarbon group of up to 10 carbons which may contain one or more ether bonds (—O—); which include (a) a bicyclic compound wherein q is 1; r is 0; ring $A^8$ is 1,4-phenylene; and ring $A^9$ is trans-1,4-cyclohexylene, 1,4-phenylene, 2,6-dioxan-1,4-diyl or 2,6-pyrimidine-1,4-diyl, in which the carbon atom in the ring bound to ring $A^8$ is defined as 1-position;

(b) a tricyclic compound wherein q and r are 1; ring $A^8$ is 1,4-phenylene; ring $A^9$ is trans-1,4-cyclohexylene or 1,4-phenylene; ring $A^{10}$ is trans-1,4-cyclohexylene, 1,4-phenylene or 2,6-pyrimidine-1,4-diyl, in which the carbon atom in the ring bound to bridge $Z^6$ is defined as 1-position; and bridge $Z^6$ is a covalent bond (—);

(c) a bicyclic or tricyclic compound wherein q is 0 or 1; r is 1; ring $A^8$ is 1,4-phenylene; ring $A^9$ is trans-1,4-cyclohexylene; ring $A^{10}$ is trans-1,4-cyclohexylene or 1,4-phenylene; and bridge $Z^6$ is ethylene (—$CH_2CH_2$—), carbonyloxy (—COO—) or a covalent bond (—); and (d) a bicyclic or tricyclic compound wherein q is 0 or 1; r is 1; ring $A^8$ is 1,4-phenylene in which at least one or both of the adjacent positions to a carbon atom bound to a cyano group are substituted by F; ring $A^9$ is trans-1,4-cyclohexylene; ring $A^{10}$ is trans-1,4-cyclohexylene or 1,4-phenylene which may be substituted by one or more F's; and bridge $Z^6$ is ethylene (—$CH_2CH_2$—), carbonyloxy (—COO—) or a covalent bond (—).

The liquid crystal composition according to the present invention may further comprise as the fourth component at least one selected from the compounds of formula (4)

$$R^5—(—A^{12}—Z^7—)_s—(—A^{13}—Z^8—)_t—A^{11}—X^1 \qquad (4)$$

wherein s and t are independently 0 or 1, and the sum of s+t is at least 1; each of $A^{11}$, $A^{12}$ and $A^{13}$ is a 6-membered ring; each of $Z^7$ and $Z^8$ represents a bridge between the rings; $X^1$ and $R^5$ are the terminal groups; $R^5$ is an alkyl or alkenyl group of up to 10 carbons; which include (a) a bicyclic or tricyclic compound wherein s is 1; t is 0 or 1; ring $A^{11}$ is 1,4-phenylene in which one of the adjacent positions to a carbon atom bound to the terminal group $X^1$ may be substituted by F; ring $A^{12}$ is 2,6-pyrimidine-1,4-diyl, in which the carbon atom in the ring bound to bridge $Z^7$ is defined as 1-position; ring $A^{13}$ is 1,4-phenylene; each of $Z^7$ and $Z^8$ is a covalent bond (—); and the terminal group $X^1$ is F; and (b) a bicyclic or tricyclic compound wherein s is 0 or 1; t is 1; ring $A^{11}$ is 1,4-phenylene in which one or both of the adjacent positions to a carbon atom bound to the terminal group $X^1$ may be substituted by F; ring $A^{12}$ is trans-1,4-cyclohexylene; ring $A^{13}$ is trans-1,4-cyclohexylene or 1,4-phenylene; $Z^7$ and $Z^8$ are independently a carbonyloxy (—COO—) or a covalent bond (—); and the terminal group $X^1$ is F or Cl.

Moreover, the invention provides a liquid crystal display element using each liquid crystal composition of the present invention.

Specific examples of $R^1$ in formula (1) can include alkyl of 1–10 carbons; alkenyl of 2–10 carbons such as 1-alkenyl of 2–10 carbons, 2-alkenyl of 3–10 carbons and 3-alkenyl of 4–10 carbons; alkoxy of 1–10 carbons; alkoxyalkyl of 2–10 carbons such as alkoxymethyl, 2-alkoxyethyl; alkoxyalkoxy such as alkoxymethoxy, 2-alkoxyethoxy; alkenyloxy of 2–10 carbons such as 2-alkenyloxy of 3–10 carbons, 3-alkenyloxy of 4–10 carbons; alkynyl of 2–10 carbons and the like. Particularly preferable are methyl, ethyl, n-propyl, n-butyl, n-pentyl, n-hexyl, n-heptyl, n-octyl, n-nonyl, vinyl, 3-butenyl, trans-3-pentenyl, 2-propenyl and trans-2-butenyl.

Specific examples of $R^2$ and $R^3$ in formula (2) can include those recited above for $R^1$ and those wherein one or more H's may be substituted by F, such as difluoromethyl, trifluoromethyl, 2-fluoroethyl, 3-fluoropropyl, 3,3-difluoropropyl, 3,3,3-trifluoropropyl, 2-fluoropropyl, 2,2-difluoropropyl, 1,2-difluoropropyl, 1-fluorobutyl, 5-fluoropentyl, 1-fluoroethenyl, 2-fluoroethenyl, 4,4-difluoro-3-butenyl, difluoromethoxy, trifluoromethoxy, etc.

Specific examples of $R^4$ in formula (3) can include those recited above for $R^1$.

Specific examples of $R^5$ in formula (4) can include methyl, ethyl, n-propyl, n-butyl, n-pentyl, n-hexyl, n-heptyl, n-octyl, n-nonyl, vinyl, 3-butenyl, trans-3-pentenyl, 2-propenyl and trans-2-butenyl.

In the liquid crystal compositions of the present invention, the first component is at least one selected from the group consisting of the bicyclic compound (1-a) and the tricyclic compound (1-b) of formula (1)

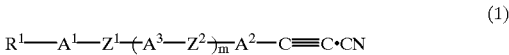

$$R^1—A^1—Z^1—(A^3—Z^2)_m—A^2—C≡C·CN \qquad (1)$$

More specifically, the bicyclic compound (1-a) and the tricyclic compound (1-b) are represented by the following formulas (1-a) and (1-b), respectively. In each formula, $A^1$, $A^2$, $A^3$, $Z^1$, $Z^2$ and $R^1$ have the same meanings as defined above.

$$R^1—A^1—Z^1—A^2—C≡C-CN \qquad (1\text{-a})$$

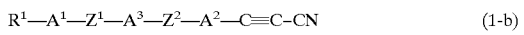

$$R^1—A^1—Z^1—A^3—Z^2—A^2—C≡C-CN \qquad (1\text{-b})$$

Suitable examples for the compounds of formulas (1-a) and (1-b) include the compounds of formulas (1-a-1) to (1-a-14) and (1-b-1) to (1-b-10). In these formulas, R has the same meaning as defined above for $R^1$.

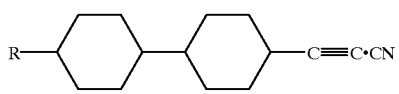 (1-a-1)

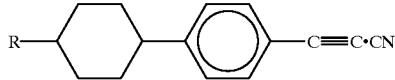 (1-a-2)

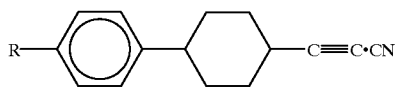 (1-a-3)

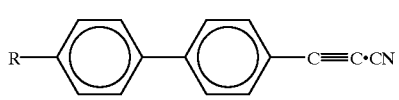 (1-a-4)

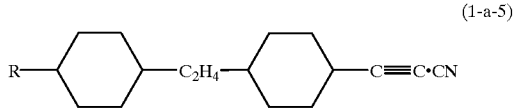 (1-a-5)

 (1-a-6)

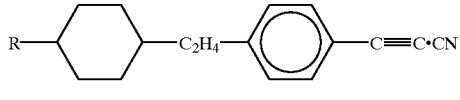 (1-a-7)

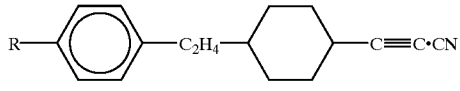 (1-a-8)

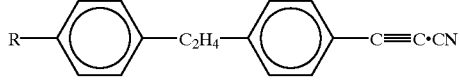 (1-a-9)

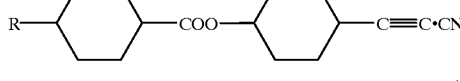 (1-a-10)

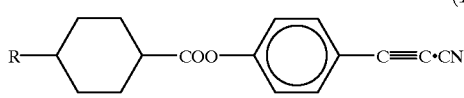 (1-a-11)

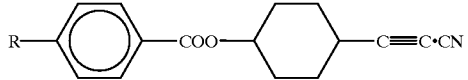 (1-a-12)

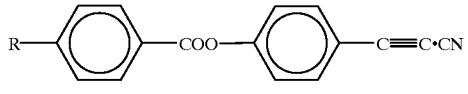 (1-a-13)

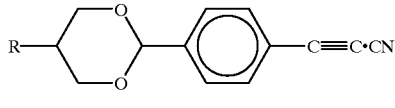 (1-a-14)

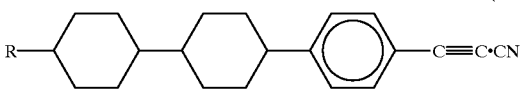 (1-b-1)

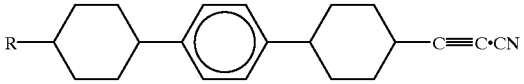 (1-b-2)

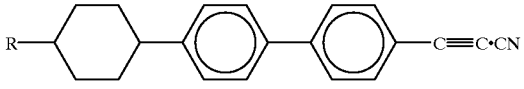 (1-b-3)

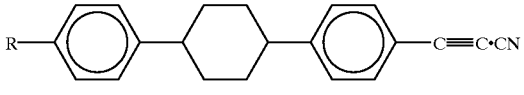 (1-b-4)

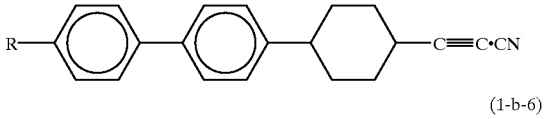 (1-b-5)

(1-b-6)

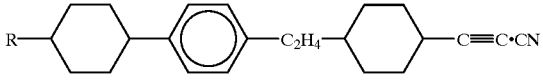 (1-b-7)

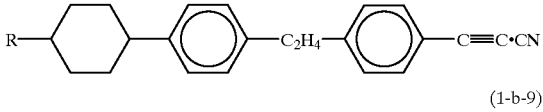 (1-b-8)

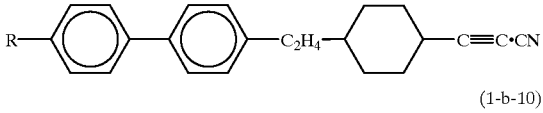 (1-b-9)

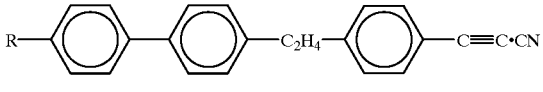 (1-b-10)

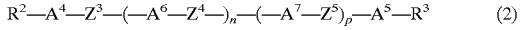

The compounds of formula (1-a) have a large positive anisotropy of the dielectric constants and low viscosity, which are principally used to control threshold voltage and provide an improved response rate. The compounds of formula (1-b) are tricyclic compounds having a positive dielectric anisotropy, which are used to broaden a nematic range and control viscosity or the like. Especially preferable first components are selected from the compounds of formulas (1-a-1), (1-a-2), (1-a-3), (1-a-4), (1-a-5), (1-a-6), (1-a-7), (1-a-8), (1-a-10), (1-a-11), (1-a-12), (1-a-13), (1-a-14), (1-b-1) and (1-b-3).

In the liquid crystal compositions of the present invention, the second component is at least one selected from the sub-group consisting of a bicyclic compound (2-a), a tricyclic compound (2-b) and a tetracyclic compound (2-c), represented by formula (2)

$$R^2-A^4-Z^3-(-A^6-Z^4-)_n-(-A^7-Z^5)_p-A^5-R^3 \quad (2)$$

More specifically, the bicyclic compounds (2-a), the tricyclic compounds (2-b) and the tetracyclic compounds (2-c) are represented by the following formulas (2-a), (2-b) and (2-c), respectively. In each formula, $A^4$, $A^5$, $A^6$, $A^7$, $Z^3$, $Z^4$, $Z^5$, $R^2$ and $R^3$ have the same meanings as defined above.

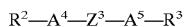 (2-a)

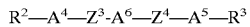 (2-b)

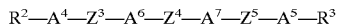 (2-c)

The compounds of formulas (2-a), (2-b) and (2-c) suitable for the second component are represented by formulas (2-a-1) to (2-a-23), (2-b-1) to (2-b-21) and (2-c-1) to (2-c-3).

In the following formulas, R and R' represent an alkyl or alkenyl group of up to 10 carbons.

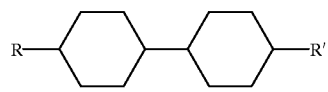 (2-a-1)

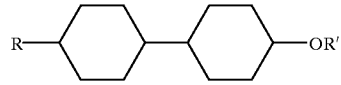 (2-a-2)

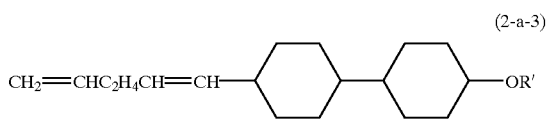 (2-a-3)

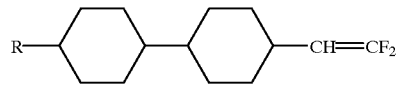 (2-a-4)

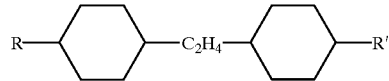 (2-a-5)

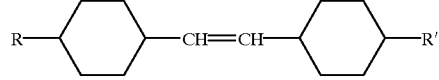 (2-a-6)

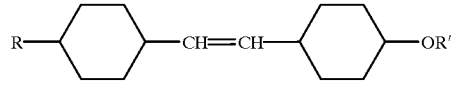 (2-a-7)

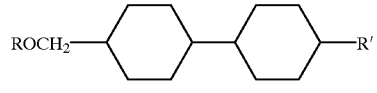 (2-a-8)

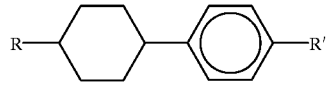 (2-a-9)

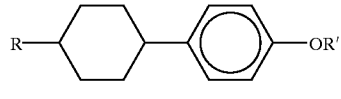 (2-a-10)

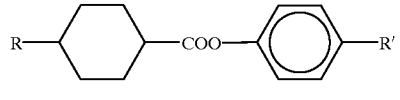 (2-a-11)

-continued

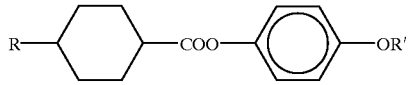 (2-a-12)

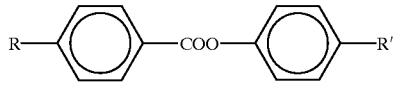 (2-a-13)

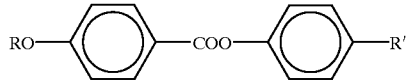 (2-a-14)

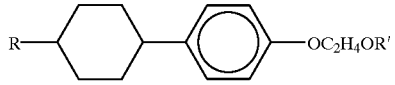 (2-a-15)

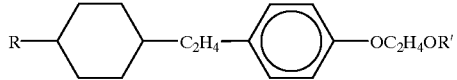 (2-a-16)

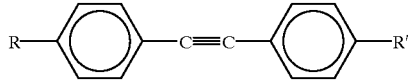 (2-a-17)

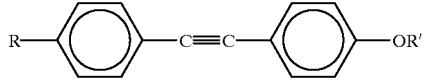 (2-a-18)

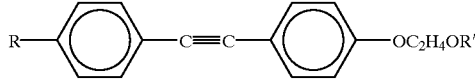 (2-a-19)

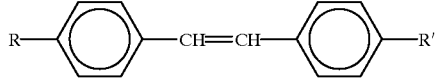 (2-a-20)

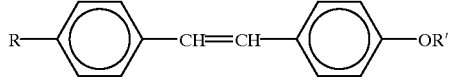 (2-a-21)

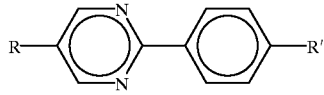 (2-a-22)

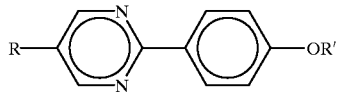 (2-a-23)

 (2-b-1)

 (2-b-2)

-continued

(2-b-3)

(2-b-4)

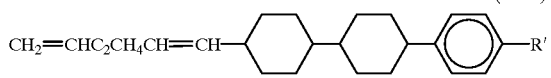
(2-b-5)

(2-b-6)

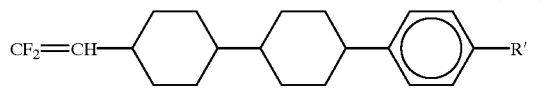
(2-b-7)

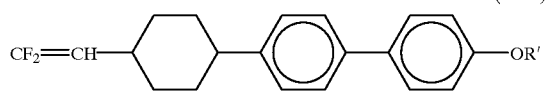
(2-b-8)

(2-b-9)

(2-b-10)

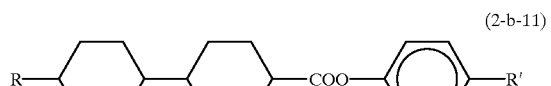
(2-b-11)

(2-b-12)

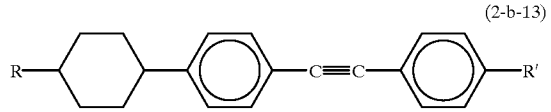
(2-b-13)

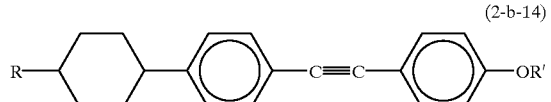
(2-b-14)

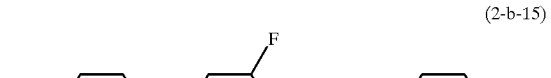
(2-b-15)

(2-b-16)

-continued

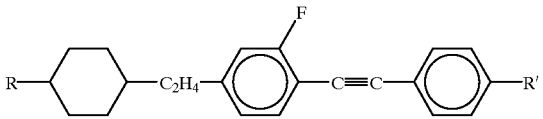
(2-b-17)

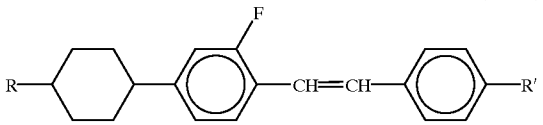
(2-b-18)

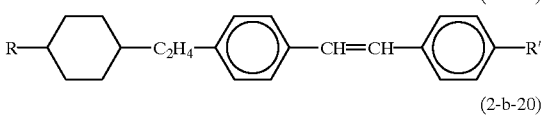
(2-b-19)

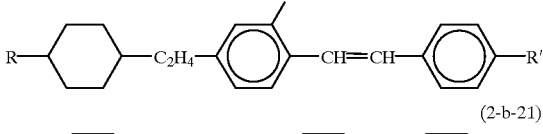
(2-b-20)

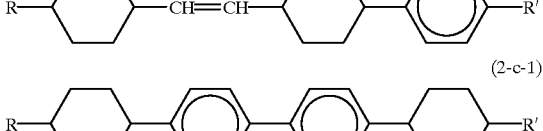
(2-b-21)

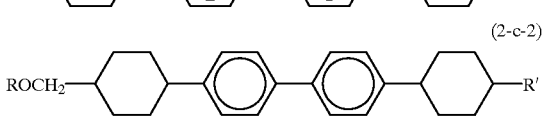
(2-c-1)

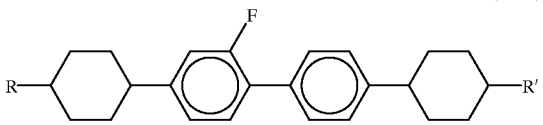
(2-c-2)

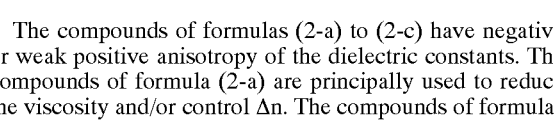
(2-c-3)

The compounds of formulas (2-a) to (2-c) have negative or weak positive anisotropy of the dielectric constants. The compounds of formula (2-a) are principally used to reduce the viscosity and/or control Δn. The compounds of formulas (2-b) and (2-c) are used to broaden a nematic range, e.g., to increase the clearing point, and/or control Δn and viscosity.

Especially preferable second components are selected from the compounds of formulas (2-a-1), (2-a-2), (2-a-3), (2-a-4), (2-a-8), (2-a-9), (2-a-10), (2-a-11), (2-a-12), (2-a-14), (2-a-17), (2-a-18), (2-a-22) and (2-a-23), the compounds of formulas (2-b-1), (2-b-2), (2-b-5), (2-b-6), (2-b-7), (2-b-8), (2-b-9), (2-b-10), (2-b-12), (2-b-13), (2-b-15), (2-b-16), (2-b-18) and (2-b-19), and the compounds of formulas (2-c-2) and (2-c-3).

The liquid crystal compositions of the invention comprise 5–40 wt. % of the first component and 30–90 wt. % of the second component based on the total weight of a liquid crystal composition.

If the amount of the first component is too little, it is difficult to attain the aimed effect of small τ. On the other hand, if the amount is too much, the viscosity of the liquid crystal composition becomes higher, which is not preferable. More preferable amount of the first component used is 5–30 wt. % based on the total weight of a liquid crystal composition.

If the amount of the second component is too little, the viscosity of the liquid crystal composition becomes too high. If the amount is too much, the threshold voltage of the liquid crystal compositions becomes higher, which is not preferable. More preferable amount of the second component used is 30–80 wt. %.

The liquid crystal compositions of the invention may further comprise as the third component at least one selected from the sub-group consisting of the bicyclic compound (3-a), the tricyclic compound (3-b), the bicyclic or tricyclic compound (3-c) and the bicyclic or tricyclic compound (3-d), represented by formula (3)

$$R^4-(A^9)_q-(-A^{10}-Z^6-)_r-A^8-CN \quad (3)$$

wherein q, r, $A^8$, $A^9$, $A^{10}$, $Z^6$ and $R^4$ have the same meanings as defined above.

Further, the composition may comprise as the fourth component at least one selected from the sub-group consisting of the bicyclic or tricyclic compound (4-a) and the bicyclic or tricyclic compound (4-b), so that the characteristics of the liquid crystal composition are more improved.

The bicyclic compounds (3-a), tricyclic compounds (3-b), bicyclic or tricyclic compounds (3-c) and bicyclic or tricyclic compounds (3-d) which are used as the third component are more specifically represented by formulas (3-a), (3-b), (3-c) and (3-d), respectively. In each formula, q, $A^9$, $A^{10}$, $Z^6$ and $R^4$ have the same meanings as defined above, and (F) means the case where the phenyl ring may be substituted by F.

(3-a)

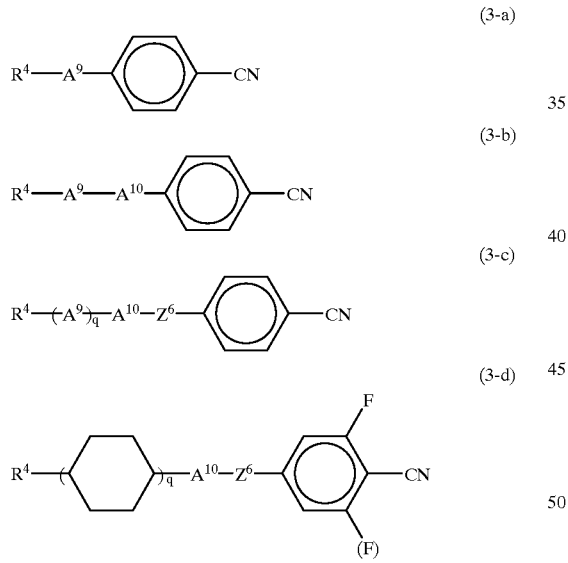
(3-b)
(3-c)
(3-d)

Examples of more preferable compounds of formulas (3-a), (3-b), (3-c) and (3-d) for the third component are represented by formulas (3-a-1) to (3-a-6), (3-b-1) to (3-b-4), (3-c-1) to (3-c-5) and (3-d-1) to (3-d-11). In the following formulas, R represents an alkyl or alkenyl group, R' represents alkanediyl or alkenediyl, and the total carbon number of R and R' is up to 10.

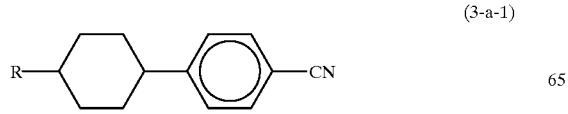
(3-a-1)

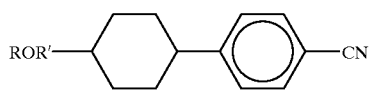
(3-a-2)

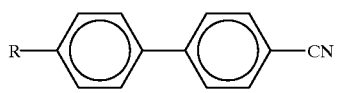
(3-a-3)

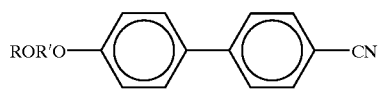
(3-a-4)

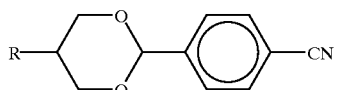
(3-a-5)

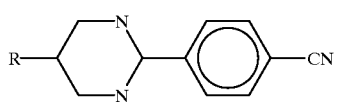
(3-a-6)

(3-b-1)

(3-b-2)

(3-b-3)

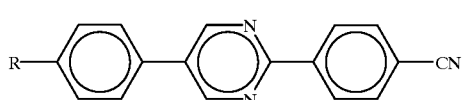
(3-b-4)

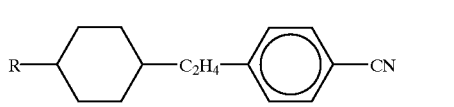
(3-c-1)

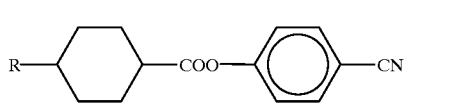
(3-c-2)

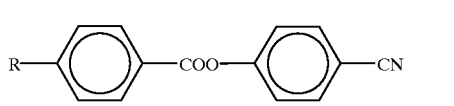
(3-c-3)

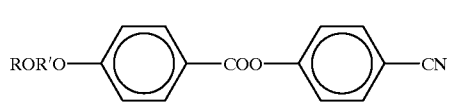
(3-c-4)

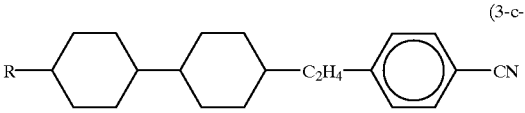
(3-c-5)

-continued (3-d-1)
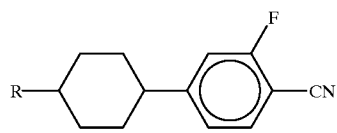

(3-d-2)
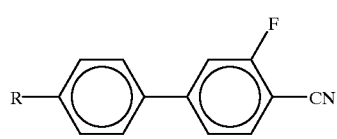

(3-d-3)
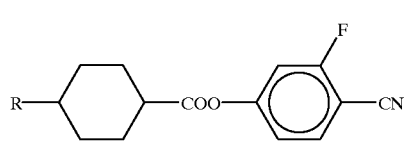

(3-d-4)
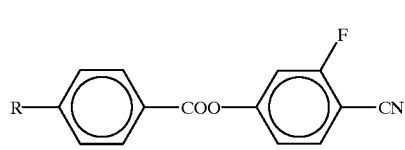

(3-d-5)
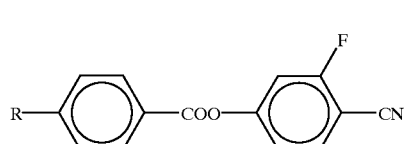

(3-d-6)

(3-d-7)
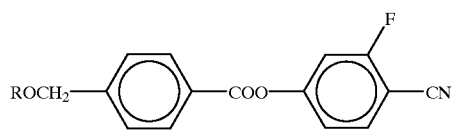

(3-d-8)
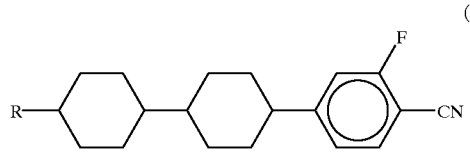

(3-d-9)
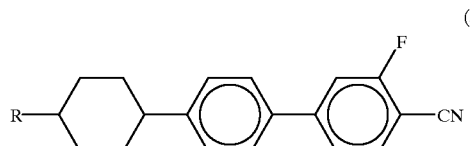

(3-d-10)
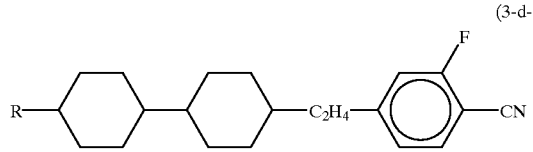

-continued (3-d-11)
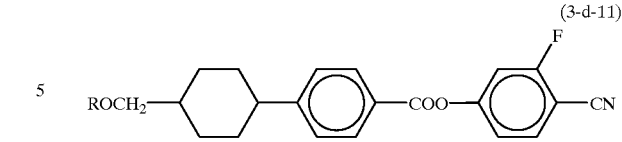

Especially preferable compounds for the third component are selected from those of formulas (3-a-1), (3-a-2), (3-a-3), (3-a-5), (3-a-6), (3-b-1), (3-b-2), (3-c-1), (3-c-3), (3-d-1), (3-d-4), (3-d-5), (3-c-6), (3-d-7), (3-d-10) and (3-d-11).

The compounds exemplified as the third component have a large positive anisotropy of the dielectric constants, which are used pricipally to reduce the threshold voltage and improve the steepness which is important as an STN feature.

The amount of the third component used is 0–50 wt. %, preferably 0–40 wt. % based on the total weight of the composition. If the amount is too much, the viscosity of the liquid crystal composition becomes too high, which is not preferable.

More specific examples of the bicyclic or tricyclic compounds represented by formula (4) are represented by the following formulas (4-a) and (4-b). In each formula, s, t, $A^{13}$, $Z^8$, $R^5$ and $X^1$ have the same meanings as defined above and (F) means the case where the phenyl ring may be substituted by F.

(4-a)
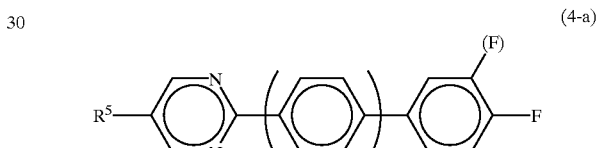

(4-b)
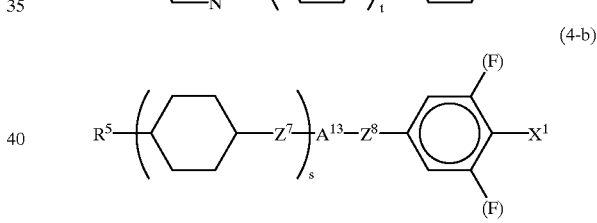

More preferable compounds of formulas (4-a) and (4-b) as the fourth component are illustrated by the following formulas (4-a-1) to (4-a-3) and (4-b-1) to (4-b-20) in which R has the same meaning as defined for $R^5$.

(4-a-1)
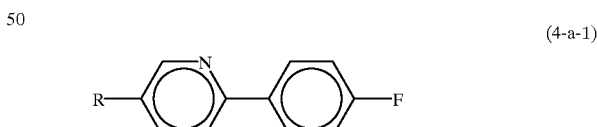

(4-a-2)
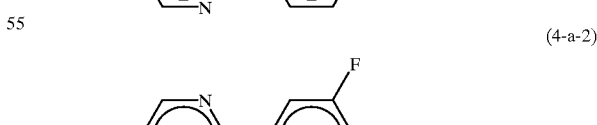

(4-a-3)
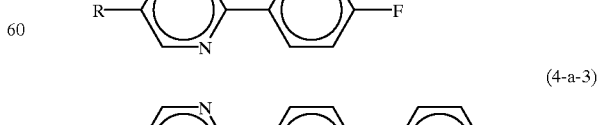

-continued

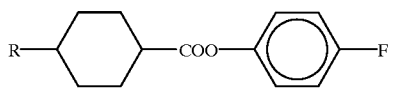 (4-b-1)

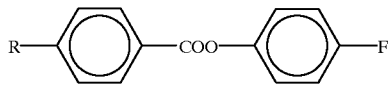 (4-b-1)

 (4-b-3)

 (4-b-4)

 (4-b-5)

 (4-b-6)

 (4-b-7)

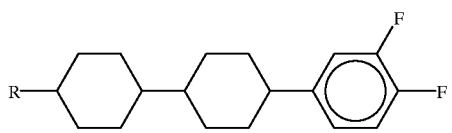 (4-b-8)

 (4-b-9)

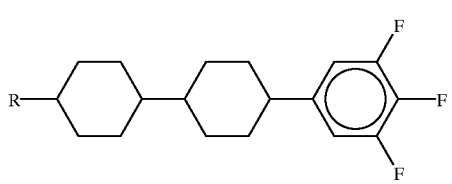 (4-b-10)

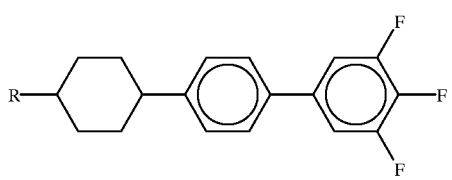 (4-b-11)

-continued

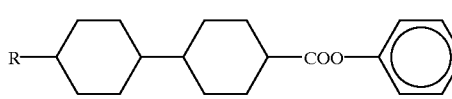 (4-b-12)

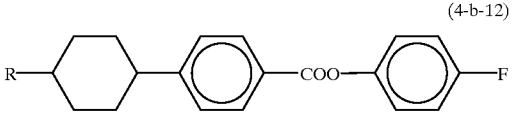 (4-b-13)

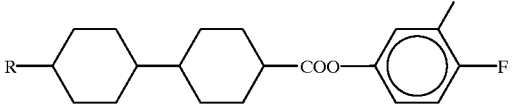 (4-b-14)

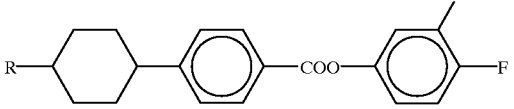 (4-b-15)

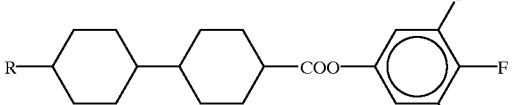 (4-b-16)

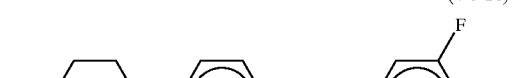 (4-b-17)

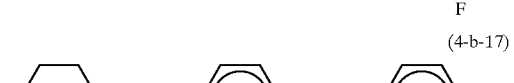 (4-b-18)

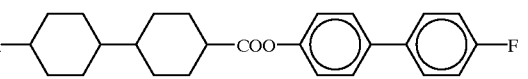 (4-b-19)

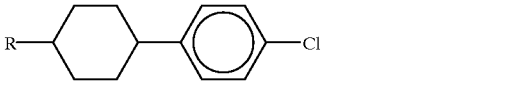 (4-b-20)

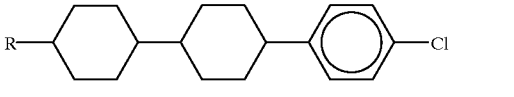

Especially preferable compounds as the fourth component are selected from those of formulas (4-a-1), (4-a-2) and (4-a-3) as well as those of formulas (4-b-1), (4-b-5), (4-b-6), (4-b-7), (4-b-8), (4-b-9), (4-b-10), (4-b-11), (4-b-12), (4-b-13), (4-b-14), (4-b-15), (4-b-16), (4-b-18), (4-b-19) and (4-b-20).

The compounds of formulas (4-a) and (4-b) have a positive anisotropy of the dielectric constants, which are used especially to reduce threshold voltage and improve a dependency on temperature. Those compounds are also used to control viscosity and Δn, and to broaden the nematic range, such as increasing clearing point, etc.

The amount of the fourth component used is 0–40 wt. %, more preferably 0–30 wt. % based on the total weight of the composition. If the amount of the fourth component used is too much, the viscosity of the liquid crystal composition becomes higher, which is not preferable.

In addition to the compounds of the above formulas (1)–(4), the liquid crystal compositions of the present invention may contain other compounds in a suitable amount within the range not impairing the object of the present invention, with a view to control threshold voltage, nematic range, Δn, dielectric anisotropy, viscosity or the like, in compliance with the liquid crystal display element to be used.

The liquid crystal compositions of the invention can be prepared by a method conventional per se. In general, a method can be employed wherein various components are dissolved at an elevated temperature. The liuquid crystal compositions of the invention are also improved and optimized by suitable additives in compliance with the intended use. Such additives are well known to a person skilled in the art and detailed in literatures.

The liquid crystal compositions of the invention can also be used as liquid crystal compositions for a guest/host (GH) mode by incorporating therein dichronic dyes such as merocyanines, styryles, azo, azomethines, azoxy, quinophthalones, anthraquinones, tetrazines or the like. Alternatively, they can be used as lquid crystal compositions for NCAP formed by micro-capsulation of nematic liquid crystals, or as liquid crystal compositions for polymer dispersion type liquid crystal display elements (PNLCD), a typical example of which is a polymer network liquid crystal display element (PNLCD) wherein a three-dimensional network polymer is formed in the liquid crystal. In addition, they can be used as liquid crystal compositions for electrically controlled birefringence (ECB) mode and dynamic scattering (DS) mode.

The invention is further illustrated by the following Examples and Comparative Examples.

In Examples and Comparative Examples, the composition ratio of nematic liquid crystals is shown by wt. %, the following compound (cholesteryl nanoate) is used as a chiral compound, and the added amount is shown by part by weight based on 100 weight parts of a nematic liquid crystal composition.

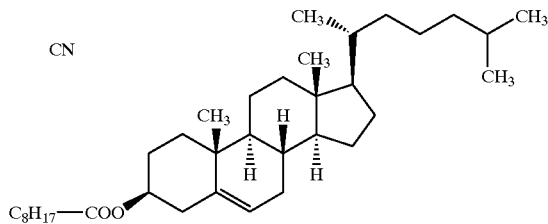

The compounds of Examples and Comparative Examples are shown by the following abbreviations, but only the carbon number is designated where the terminal group is an alkyl group.

Hx: trans-1,4-cyclohexylene
Be: 1,4-phenylene
Be (F): 1,4-phenylene which is substituted at 3-position by F
Be (F,F): 1,4-phenylene which is substituted at 3,5-positions by F
Py: 1,3-pyrimidine-2,5-diyl
Do: 1,3-dioxan-2,5-diyl Tr: ethynylene bond
CN: chiral compound (cholesteryl nanoate)

The chracteristic data of the liquid crystal compositions are illustrated by the nematic phase transition temperature (TNI), viscosity ($\eta_{20}$) at 20° C., optical anisotropy (Δn) at 25° C., dielectric anisotropy (Δε) at 25° C., and threshold voltage (Vth) at 25° C.

The determinations of steepness (γ) and response rate (τ) were conducted by using a cell at a twist angle of 240°. The cell thickness was selected so that the product (Δn.d) of cell thickness (d) by optical anisotropy (Δn) was about 0.82, and the amount of chiral added was adjusted so that the ratio (d/p) of cell thickness (d) and pitch (p) of the liquid crystal composition was about 0.5.

The cell evaluation was conducted in a yellow mode, and the voltage-transmittance characteristics (V-T characteristics) was determined by a rectangular wave at 70 Hz. The voltage at 90% transmittance is shown as $V_{90}$ [V] and the voltage at 10% transmittance as $V_{10}$ [V] and the parameter for steepness is expressed as $\gamma = V_{10}/V_{90}$. The nearer the value of γ to 1, the better.

Response rate was determined by a driving voltage where the contrast reached to maximum, using a voltage wave form at 1/240 duty and 1/16 bias.

COMPARATIVE EXAMPLE 1

The following composition comprising the compounds equivalent to the first and third components of the present invention and not comprising the compounds equivalent to the second and fourth components of the present invention was prepared and determined for its characteristics.

| | |
|---|---|
| 5-Hx—Be—Be—Tr—CN | 10.0% |
| 3-Hx—Be—CN | 27.0% |
| 5-Hx—Be—CN | 36.0% |
| 7-Hx—Be—CN | 27.0% |
| TNI = 59.6 (° C.) | |
| $\eta_{20}$ = 29.0 (mPa.s) | |
| Δn = 0.135 | |
| Δε = 11.1 | |
| $V_{th}$ = 1.47 (v) | |
| CN | 2.0 parts |
| γ = 1.03 | |
| τ = 560 (msec) | |

This liquid crystal composition has low clearing point, high viscosity, small γ and large τ. Therefore the composition has no practical use.

COMPARATIVE EXAMPLE 2

The following composition having a similar construction as in Comparative Example 1 which comprises the compound equivalent to the third component of the present invention was prepared and determined for its characteristics.

| | |
|---|---|
| 5-Be—Be—Tr—CN | 10.0% |
| 3-Hx—Be—CN | 21.6% |
| 5-Hx—Be—CN | 32.4% |
| 7-Hx—Be—CN | 22.5% |
| 5-Hx—Be—Be—CN | 13.5% |
| TNI = 65.0 (° C.) | |
| $\eta_{20}$ = 35.0 (mPa.s) | |
| Δn = 0.139 | |

-continued

| | | |
|---|---|---|
| Δε = 11.0 | | |
| $V_{th}$ = 1.63 (v) | | |
| CN | | 1.9 parts |
| γ = 1.03 | | |
| τ = 590 (msec) | | |

This liquid crystal composition has low clearing point, high viscosity, small γ and large τ. Therefore the composition has no practical use.

COMPARATIVE EXAMPLE 3

The following composition similar as in Comparative Example 2 in which the compound equivalent to the first component was altered was prepared and determined for its characteristics.

| | | |
|---|---|---|
| 6-Hx—COO—Be—Tr—CN | 10.0% | |
| 3-Hx—Be—CN | 21.6% | |
| 5-Hx—Be—CN | 32.4% | |
| 7-Hx—Be—CN | 22.5% | |
| 5-Hx—Be—Be—CN | 13.5% | |
| TNI = 69.0 (° C.) | | |
| $\eta_{20}$ = 35.0 (mPa.s) | | |
| Δn = 0.140 | | |
| Δε = 18.0 | | |
| $V_{th}$ = 1.66 (v) | | |
| CN | | 1.9 parts |
| γ = 1.03 | | |
| τ = 600 (msec) | | |

This liquid crystal composition has small γ, high viscosity and large τ. Therefore the composition has no practical use.

EXAMPLE 1

| | | |
|---|---|---|
| 5-Hx—Be—Tr—CN | 10.0% | |
| 3-Hx—Be—Tr—CN | 20.0% | |
| 1-Be—Tr—Be-3 | 8.0% | |
| 2-Be—Tr—Be-1 | 10.0% | |
| 2-Be—Tr—Be—OCH$_3$ | 1.6% | |
| 3-Be—Tr—Be—OCH$_3$ | 1.6% | |
| 4-Be—Tr—Be—OCH$_3$ | 1.6% | |
| 4-Be—Tr—Be—OC$_2$H$_5$ | 1.6% | |
| 5-Be—Tr—Be—OCH$_3$ | 1.6% | |
| 3-Hx—Hx—Be-1 | 11.0% | |
| 3-Hx—Hx—Be-3 | 9.0% | |
| 3-Hx—Be(F)—Tr—Be-2 | 6.0% | |
| 3-Hx—Be(F)—Tr—Be-3 | 6.0% | |
| 3-Hx—C$_2$H$_4$—Be—Tr—Be-2 | 4.0% | |
| 3-Hx—C$_2$H$_4$—Be—Tr—Be-3 | 4.0% | |
| 3-Hx—C$_2$H$_4$—Be—Tr—Be-4 | 4.0% | |
| TNI = 106.7 (° C.) | | |
| $\eta_{20}$ = 16.7 (mPa.s) | | |
| Δn = 0.144 | | |
| Δε = 8.9 | | |
| $V_{th}$ = 2.03 (v) | | |
| CN | | 1.8 parts |
| γ = 1.05 | | |
| τ = 290 (msec) | | |

This liquid crystal composition has higher clearing point and lower viscosity compared to Comparative Examples, and shows small τ for γ of 1.05. Therefore this composition is of practical use.

EXAMPLE 2

| | | |
|---|---|---|
| 3-Hx—Be—Tr—CN | 7.0% | |
| 5-Hx—Be—Tr—CN | 15.0% | |
| 3-Hx—Be—OC$_2$H$_5$ | 10.0% | |
| 3-Hx—Hx-4 | 5.0% | |
| 2-Be—Tr—Be—OCH$_3$ | 6.8% | |
| 3-Be—Tr—Be—OCH$_3$ | 6.8% | |
| 4-Be—Tr—Be—OCH$_3$ | 6.8% | |
| 4-Be—Tr—Be—OC$_2$H$_5$ | 6.8% | |
| 5-Be—Tr—Be—OCH$_3$ | 6.8% | |
| 3-Hx—Hx—Be—OCH$_3$ | 3.0% | |
| 3-Hx—C$_2$H$_4$—Be—Tr—Be-2 | 2.0% | |
| 3-Hx—C$_2$H$_4$—Be—Tr—Be-3 | 3.0% | |
| 3-Hx—C$_2$H$_4$—Be—Tr—Be-4 | 3.0% | |
| 3-Hx—Be(F)—Tr—Be-2 | 6.0% | |
| 3-Hx—Be(F)—Tr—Be-3 | 6.0% | |
| 3-Hx—Be(F)—Tr—Be-4 | 6.0% | |
| TNI = 100.9 (° C.) | | |
| $\eta_{20}$ = 19.5 (mPa.s) | | |
| Δn = 0.222 | | |
| Δε = 6.4 | | |
| $V_{th}$ = 2.26 (v) | | |
| CN | | 1.2 parts |
| γ = 1.05 | | |
| τ = 315 (msec) | | |

EXAMPLE 3

| | | |
|---|---|---|
| 5-Hx—Be—Tr—CN | 12.0% | |
| 1-CH=CH—C$_2$H$_2$—Be—COO—Be(F,F)—CN | 10.0% | |
| 3-Hx—Be—OC$_2$H$_5$ | 9.0% | |
| 5-Hx—Hx—CH=CF$_2$ | 20.0% | |
| 3-Hx—Hx—Be-1 | 4.0% | |
| F$_2$C=CH—Hx—Hx—Be-1 | 18.0% | |
| F$_2$C=CH—Hx—Be—Be-1 | 13.0% | |
| 3-Hx—C$_2$H$_4$—Be—Tr—Be-2 | 5.0% | |
| 3-Hx—C$_2$H$_4$—Be—Tr—Be-3 | 5.0% | |
| 3-Hx—C$_2$H$_4$—Be—Tr—Be-4 | 4.0% | |
| TNI = 102.7 (° C.) | | |
| $\eta_{20}$ = 16.2 (mPa.s) | | |
| Δn = 0.141 | | |
| Δε = 8.9 | | |
| $V_{th}$ = 2.03 (v) | | |
| CN | | 1.9 parts |
| γ = 1.04 | | |
| τ = 305 (msec) | | |

EXAMPLE 4

| | | |
|---|---|---|
| 3-Hx—Be—Tr—CN | 15.0% | |
| 1-CH=CH—C$_2$H$_2$—Be—COO—Be(F,F)—CN | 3.0% | |
| 3-Hx—Be—CN | 14.0% | |
| 3-Hx—Be—OC$_2$H$_5$ | 7.0% | |
| 3-Hx—Hx-4 | 11.0% | |
| 3-Hx—Hx-5 | 5.0% | |
| 5-Hx—Hx-2 | 4.0% | |
| 3-Hx—Hx—Be-1 | 10.0% | |
| 3-Hx—Hx—Be-3 | 16.0% | |
| 3-Hx—Be(F)—Tr—Be-2 | 3.0% | |
| 3-Hx—C$_2$H$_4$—Be—Tr—Be-2 | 4.0% | |
| 3-Hx—C$_2$H$_4$—Be—Tr—Be-3 | 4.0% | |
| 3-Hx—C$_2$H$_4$—Be—Tr—Be-4 | 4.0% | |
| TNI = 107.0 (° C.) | | |
| Δn = 0.132 | | |
| Δε = 8.1 | | |
| $V_{th}$ = 2.22 (v) | | |
| CN | | 2.0 parts |

-continued

γ = 1.04
τ = 275 (msec)

EXAMPLE 5

| | |
|---|---|
| 3-Hx—Hx—Tr—CN | 9.0% |
| CH$_3$CH=CHC$_2$H$_4$—Be—COO—Be(F,F)—CN | 8.0% |
| 3-Hx—Be—CN | 24.0% |
| 3-Hx—Be—OC$_2$H$_5$ | 12.0% |
| 3-Hx—Hx-4 | 8.0% |
| 5-Hx—Hx-2 | 5.0% |
| 3-Hx—Hx—Be-1 | 11.0% |
| 3-Hx—Be(F)—Tr—Be-2 | 5.0% |
| 3-Hx—Be(F)—Tr—Be-3 | 5.0% |
| 3-Hx—C$_2$H$_4$—Be—Tr—Be-2 | 5.0% |
| 3-Hx—C$_2$H$_4$—Be—Tr—Be-3 | 4.0% |
| 3-Hx—C$_2$H$_4$—Be—Tr—Be-4 | 4.0% |

TNI = 94.0 (° C.)
η$_{20}$ = 15.0 (mPa.s)
Δn = 0.142
Δε = 10.2
V$_{th}$ = 1.94 (v)
CN  1.9 parts
γ = 1.03
τ = 320 (msec)

EXAMPLE 6

| | |
|---|---|
| 5-Be—Hx—Tr—CN | 10.0% |
| CH$_3$CH=CHC$_2$H$_4$—Be—COO—Be(F,F)—CN | 8.0% |
| 3-Hx—Be—CN | 24.0% |
| 3-Hx—Be—OC$_2$H$_5$ | 5.0% |
| 3-Hx—Hx-4 | 4.0% |
| 3-Hx—Hx—Be-1 | 10.0% |
| 3-Hx—Hx—Be-3 | 17.0% |
| 2-Hx—Hx—Be-1 | 5.0% |
| 3-Hx—Be(F)—CH=CH—Be-2 | 5.0% |
| 3-Hx—C$_2$H$_4$—Be—Tr—Be-2 | 4.0% |
| 3-Hx—C$_2$H$_4$—Be—Tr—Be-3 | 4.0% |
| 3-Hx—C$_2$H$_4$—Be—Tr—Be-4 | 4.0% |

TNI = 98.3 (° C.)
η$_{20}$ = 18.2 (mPa.s)
Δn = 0.144
Δε = 10.7
V$_{th}$ = 19.6 (v)
CN  1.8 parts
γ = 1.03
τ = 370 (msec)

EXAMPLE 7

| | |
|---|---|
| 5-Hx—C$_2$H$_4$—Be—Tr—CN | 5.0% |
| C$_3$H$_7$OCH$_2$—Be—COO—Be(F)—CN | 6.0% |
| H$_2$C=CH—C$_2$H$_4$—Hx—Be—CN | 11.0% |
| 3-Hx—Be—OC$_2$H$_5$ | 3.0% |
| 2-Be—Tr—Be—OCH$_3$ | 6.8% |
| 3-Be—Tr—Be—OCH$_3$ | 6.8% |
| 4-Be—Tr—Be—OCH$_3$ | 6.8% |
| 4-Be—Tr—Be—OC$_2$H$_5$ | 6.8% |
| 5-Be—Tr—Be—OCH$_3$ | 6.8% |
| 3-Hx—Hx—Be—OCH$_3$ | 3.0% |
| 3-Hx—C$_2$H$_4$—Be—Tr—Be-2 | 2.0% |
| 3-Hx—C$_2$H$_4$—Be—Tr—Be-3 | 3.0% |
| 3-Hx—C$_2$H$_4$—Be—Tr—Be-4 | 3.0% |
| 3-Hx—Be(F)—Tr—Be-2 | 6.0% |
| 3-Hx—Be(F)—Tr—Be-3 | 6.0% |
| 3-Hx—Be(F)—Tr—Be-4 | 6.0% |
| 2-Py—Be—Hx-3 | 4.0% |
| 3-Py—Be—Hx-3 | 4.0% |
| 4-Py—Be—Be-3 | 4.0% |

TNI = 99.6 (° C.)
η$_{20}$ = 28.0 (mPa.s)
Δn = 0.219
Δε = 7.6
V$_{th}$ = 2.10 (v)
CN  1.2 parts
γ = 1.08
τ = 180 (msec)

EXAMPLE 8

| | |
|---|---|
| 3-Hx—Hx—Be—Tr—CN | 3.0% |
| 5-Hx—Be—Be—Tr—CN | 6.0% |
| CH$_3$CH=CH—C$_2$H$_4$—Be—COO—Be(F,F)—CN | 10.0% |
| 3-Hx—Be—CN | 17.0% |
| 3-Hx—Be(F)—CN | 5.0% |
| 2-Hx—Hx—Be(F)—CN | 4.0% |
| 3-Hx—Hx—Be(F)—CN | 4.0% |
| 3-Hx—Hx-4 | 6.0% |
| 3-Hx—Be—OC$_2$H$_5$ | 15.0% |
| 3-Hx—Hx—Be-1 | 7.0% |
| 3-Hx—Hx—Be—OCH$_3$ | 4.0% |
| 3-Hx—Hx—Be-3 | 4.0% |
| 3-Hx—C$_2$H$_4$—Be—Tr—Be-2 | 3.0% |
| 3-Hx—C$_2$H$_4$—Be—Tr—Be-3 | 3.0% |
| 3-Hx—C$_2$H$_4$—Be—Tr—Be-4 | 3.0% |
| CH$_3$OCH$_2$—Hx—Be—Be—Hx-3 | 6.0% |

TNI = 98.1 (° C.)
η$_{20}$ = 27.7 (mPa.s)
Δn = 0.138
Δε = 11.7
V$_{th}$ = 1.68 (v)
CN  1.9 parts
γ = 1.05
τ = 370 (msec)

EXAMPLE 9

| | |
|---|---|
| 3-Be—COO—Be—Tr—ON | 6.0% |
| 5-Hx—Be—Tr—CN | 4.0% |
| 3-Be—COO—Be(F)—CN | 8.0% |
| 5-Py—Be—CN | 8.0% |
| H$_2$C=CH—Hx—Be—CN | 4.0% |
| CH$_3$CH=CH—Hx—Be—CN | 4.0% |
| 5-Hx—Hx—CH=CH$_2$ | 10.0% |
| 3-Hx—Hx—C$_2$H$_4$CH=CH$_2$ | 7.0% |
| 3-Hx—Hx—C$_2$H$_4$CH=CHCH$_3$ | 7.0% |
| H$_2$C=CH—Hx—Be-1 | 8.0% |
| H$_2$C=CHC$_2$H$_4$—Hx—Hx—Be-1 | 15.0% |
| 3-Hx—Hx—COO—Be(F)—F | 5.0% |
| 3-Hx—Be—Tr—Be-1 | 5.0% |
| 3-Hx—Be—Tr—Be-2 | 5.0% |
| 3-Hx—Be—Tr—Be-3 | 4.0% |

TNI = 103.4 (° C.)
η$_{20}$ = 15.2 (mPa.s)
Δn = 0.142
Δε = 10.7
V$_{th}$ = 1.89 (v)
CN  1.9 parts
γ = 1.05
τ = 290 (msec)

EXAMPLE 10

| | |
|---|---|
| 4-Be—Be—Tr—CN | 7.0% |
| 2-Be—Be—CN | 7.0% |
| 2-Hx—Be—CN | 10.0% |
| 3-Hx—Be—CN | 13.0% |
| 3-Hx—Hx—Be—F | 5.0% |
| 2-Hx—Hx—Be—CN | 4.0% |
| 3-Hx—Hx—Be—CN | 6.0% |
| 5-Py—Be—F | 6.0% |
| 3-Py—Be—Be—F | 6.0% |
| 2-Be—Tr—Be—OCH$_3$ | 2.0% |
| 2-Hx—Hx—Be-1 | 6.0% |
| 3-Hx—Hx—Be-1 | 8.0% |
| 3-Hx—Hx—Be-3 | 15.0% |
| 3-Hx—Hx—Be—OCH$_3$ | 5.0% |
| TNI = 102.4 (° C.) | |
| $\eta_{20}$ = 21.7 (mPa.s) | |
| $\Delta n$ = 0.151 | |
| $\Delta\epsilon$ = 9.2 | |
| $V_{th}$ = 1.84 (v) | |
| CN | 1.7 parts |
| $\gamma$ = 1.06 | |
| $\tau$ = 270 (msec) | |

EXAMPLE 11

| | |
|---|---|
| 3-Py—Be—Tr—CN | 9.0% |
| 3-Hx—Be—CN | 16.0% |
| 3-Hx—Hx-5 | 10.0% |
| H$_2$C=CHC$_2$H$_4$CH=CH—Hx—Hx-1 | 2.0% |
| CH$_3$OCH$_2$—Hx—Hx-3 | 8.0% |
| 2-Hx—Hx—Be-1 | 7.0% |
| 3-Hx—Hx—Be—OCH$_3$ | 4.0% |
| H$_2$C=CHC$_2$H$_4$CH=CH—Hx—Be-1 | 13.0% |
| 2-Hx—Hx—Be(F)—F | 3.0% |
| 3-Hx—Hx—Be(F)—F | 3.0% |
| 5-Hx—Hx—Be(F)—F | 3.0% |
| 2-Hx—Be—Be(F)—F | 1.3% |
| 3-Hx—Be—Be(F)—F | 1.3% |
| 5-Hx—Be—Be(F)—F | 2.4% |
| 5-Hx—Be—Be(F,F)—F | 3.0% |
| 6-Hx—Hx—COO—Be(F)—F | 6.0% |
| C$_2$H$_5$OCH$_2$—Hx—Be—CN | 8.0% |
| TNI = 92.8 (° C.) | |
| $\eta_{20}$ = 16.6 (mPa.s) | |
| $\Delta n$ = 0.155 | |
| $\Delta\epsilon$ = 8.6 | |
| $V_{th}$ = 1.95 (v) | |
| CN | 1.7 parts |
| $\gamma$ = 1.04 | |
| $\tau$ = 285 (msec) | |

EXAMPLE 12

| | |
|---|---|
| 3-Do—Be—Tr—CN | 10.0% |
| 2-Hx—COO—Be—Tr—CN | 4.0% |
| 4-Do—Be—CN | 10.0% |
| 2-Be—COO—Be—CN | 12.0% |
| 3-Py—Be(F)—F | 6.0% |
| 3-Hx—COO—Be—OC$_4$H$_9$ | 11.9% |
| 4-Hx—COO—Be—OC$_2$H$_5$ | 8.9% |
| 5-Hx—COO—Be—OCH$_3$ | 8.9% |
| 3-Hx—COO—Be—OC$_2$H$_5$ | 7.4% |
| 5-Hx—COO—Be—OC$_2$H$_5$ | 5.9% |
| 3-Hx—Hx—Be-1 | 6.0% |
| 3-Hx—C$_2$H$_4$—Be—Tr—Be-2 | 5.0% |
| 3-Hx—C$_2$H$_4$—Be—Tr—Be-3 | 4.0% |
| TNI = 73.8 (° C.) | |
| $\eta_{20}$ = 30.6 (mPa.s) | |

| | |
|---|---|
| $\Delta n$ = 0.144 | |
| $\Delta\epsilon$ = 11.7 | |
| $V_{th}$ = 1.45 (v) | |
| CN | 1.8 parts |
| $\gamma$ = 1.06 | |
| $\tau$ = 305 (msec) | |

EXAMPLE 13

| | |
|---|---|
| 5-Hx—Be—Tr—CN | 5.0% |
| 3-Hx—Be—CN | 20.0% |
| H$_2$C=CHC$_2$H$_4$—Hx—Be—CN | 9.0% |
| 3-Hx—Be(F)—CN | 2.0% |
| 3-Hx—Hx-4 | 11.0% |
| 2-Be—Tr—Be-1 | 10.0% |
| 4-Py—Be-2 | 3.0% |
| 3-Py—Be-4 | 3.0% |
| 3-Hx—Hx—Be-1 | 9.0% |
| 3-Hx—Hx—Be-3 | 15.0% |
| 3-Hx—Hx—Be—OCH$_3$ | 5.0% |
| 3—Hx—COO—Be—COO—Be—F | 2.0% |
| 3-Hx—COO—Be—COO—Be-1 | 2.0% |
| 7-Hx—Be—Cl | 2.0% |
| 2-Hx—Hx—Be—Cl | 2.0% |
| TNI = 80.9 (° C.) | |
| $\eta_{20}$ = 14.8 (mPa.s) | |
| $\Delta n$ = 0.128 | |
| $\Delta\epsilon$ = 5.0 | |
| $V_{th}$ = 2.23 (v) | |
| CN | 2.0 parts |
| $\gamma$ = 1.06 | |
| $\tau$ = 245 (msec) | |

EXAMPLE 14

| | |
|---|---|
| 3-Hx—C$_2$H$_4$—Hx—Tr—CN | 2.0% |
| 3-Be—C$_2$H$_4$—Hx—Tr—CN | 2.0% |
| 5-Hx—Be—Be—Tr—CN | 8.0% |
| CH$_3$CH=CHC$_2$H$_4$—Be—COO—Be(F,F)—CN | 8.0% |
| 3-Hx—Be—CN | 18.0% |
| 3-Hx—Be—OC$_2$H$_5$ | 15.0% |
| 3-Hx—Hx-4 | 8.0% |
| 5-Hx—Hx-2 | 5.0% |
| 3-Hx—Hx—Be-1 | 11.0% |
| 3-Hx—Be(F)—Tr—Be-2 | 5.0% |
| 3-Hx—Be(F)—Tr—Be-3 | 5.0% |
| 3-Hx—C$_2$H$_4$—Be—Tr—Be-2 | 5.0% |
| 3-Hx—C$_2$H$_4$—Be—Tr—Be-3 | 4.0% |
| 3-Hx—C$_2$H$_4$—Be—Tr—Be-4 | 4.0% |
| TNI = 89.6 (° C.) | |
| $\eta_{20}$ = 18.2 (mPa.s) | |
| $\Delta n$ = 0.143 | |
| $\Delta\epsilon$ = 9.4 | |
| $V_{th}$ = 2.02 (v) | |
| CN | 1.8 parts |
| $\gamma$ = 1.03 | |
| $\tau$ = 360 (msec) | |

EXAMPLE 15

| | |
|---|---|
| 3-Hx—Be—Tr—CN | 10.0% |
| 5-Hx—Be—Tr—CN | 5.0% |
| 3-Be—COO—Be(F)—CN | 3.0% |
| 3-Hx—Be—CN | 10.0% |
| CH$_2$=CHC$_2$H$_4$—Hx—Be—CN | 7.0% |

-continued

| | |
|---|---|
| 3-Hx—Be—OC$_2$H$_5$ | 8.0% |
| 3-Hx—Hx-4 | 7.0% |
| 5-Hx—Hx—CH=CH$_2$ | 4.0% |
| 3-Hx—CH=CH—Hx—CH=CH$_2$ | 5.0% |
| 3-Hx—CH=CH—Hx-2 | 4.0% |
| 3-Hx—Hx—Be-1 | 10.0% |
| CH$_2$=CH—Hx—Hx—Be-1 | 6.0% |
| 3-Hx—Hx—Be-3 | 6.0% |
| 3-Hx—C$_2$H$_4$—Be—Tr—Be-2 | 4.0% |
| 3-Hx—C$_2$H$_4$—Be—Tr—Be-3 | 4.0% |
| 3-Hx—Be—Tr—Be-2 | 4.0% |
| 3-Hx—Be—Tr—Be-3 | 3.0% |
| TNI = 101.1 (° C.) | |
| $\eta_{20}$ = 12.5 (mPa.s) | |
| $\Delta$n = 0.133 | |
| $\Delta\epsilon$ = 8.3 | |
| V$_{th}$ = 2.20 (v) | |
| CN | 1.9 parts |
| $\gamma$ = 1.03 | |
| $\tau$ = 272 (msec) | |

EXAMPLE 16

| | |
|---|---|
| 3-Hx—Be—Tr—CN | 12.0% |
| 4-Be—Be—Tr—CN | 3.0% |
| CH$_3$CH=CHC$_2$H$_4$—Be—COO—Be(F,F)—CN | 3.0% |
| 3-Hx—Be—CN | 16.0% |
| 3-Hx—Be—OC$_2$H$_5$ | 7.0% |
| 3-Hx—Hx-4 | 10.0% |
| 3-Hx—CH=CH—Hx—CH=CH$_2$ | 7.0% |
| 3-Hx—CH=CH—Hx-2 | 7.0% |
| 3-Hx—Hx—Be-1 | 8.0% |
| 3-Hx—CH=CH—Hx—Be-1 | 6.0% |
| CH$_2$=CH—Hx—CH=CH—Hx—Be-1 | 6.0% |
| 3-Hx—C$_2$H$_4$—Be—Tr—Be-2 | 4.0% |
| 3-Hx—C$_2$H$_4$—Be—Tr—Be-3 | 4.0% |
| 3-Hx—Be—Tr—Be-2 | 3.0% |
| 5-Hx—Be—Be—Hx-3 | 2.0% |
| 5-Hx—Be(F)—Be—Hx-3 | 2.0% |
| TNI = 99.2 (° C.) | |
| $\eta_{20}$ = 11.8 (mPa.s) | |
| $\Delta$n = 0.131 | |
| $\Delta\epsilon$ = 8.2 | |
| V$_{th}$ = 2.16 (v) | |
| CN | 1.9 parts |
| $\gamma$ = 1.04 | |
| $\tau$ = 259 (msec) | |

As shown in the Examples, the present invention can provide liquid crystal compositions having high clearing point and small $\tau$ (responsive rate), especially to cope with an outdoor use and high responsive rate, while satisfying various characteristics required for an STN display mode.

What is claimed is:

1. A liquid crystal composition comprising at least two components, in which the first component is at least one selected from the compounds of formula (1)

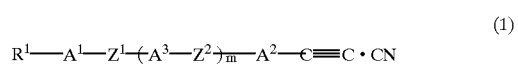

(1)

wherein m is 0 or 1; each of A$^1$, A$^2$ and A$^3$ represents a 6-membered ring; each of Z$^1$ and Z$^2$ represents a bridge between the rings; and R$^1$ represents a terminal group selected from a straight or branched hydrocarbon group of 1–10 carbons which may contain one or more ether bonds (—O—) in the chain; which include (a) a bicyclic compound wherein m is 0; ring A$^1$ is trans-1,4-cyclohexylene, 1,4-phenylene, 2,6-dioxan-1, 4-diyl or 2,6-pyrimidine-1,4-diyl, in which the carbon atom in the ring bound to bridge Z$^1$ is defined as 1-position; ring A$^2$ is trans-1,4-cyclohexylene or 1,4-phenylene; and bridge Z$^1$ is ethylene (—CH$_2$CH$_2$—), carbonyloxy (—COO—) or a covalent bond (—); and (b) a tricyclic compound wherein m is 1; rings A$^1$, A$^2$ and A$^3$ are each independently trans-1,4-cyclohexylene or 1,4-phenylene; bridge Z$^1$ is a covalent bond (—); and bridge Z$^2$ is ethylene (—CH$_2$CH$_2$—) or a covalent bond (—);

and the second component is at least one selected from the compounds of formula (2)

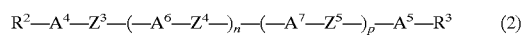

(2)

wherein n and p are each independently 0 or 1; each of A$^4$, A$^5$, A$^6$ and A$^7$ represents a six-membered ring; each of Z$^3$, Z$^4$ and Z$^5$ represents a bridge between the rings; and both R$^2$ and R$^3$ represent a terminal group; which include (a) a bicyclic compound wherein n and p are 0; ring A$^4$ is trans-1,4-cyclohexylene, 1,4-phenylene or 2,6-pyrimidine-1,4-diyl, in which the carbon atom in the ring bound to bridge Z$^3$ is defined as 1-position; ring A$^5$ is trans-1,4-cyclohexylene or 1,4-phenylene; bridge Z$^3$ is ethynylene, ethenylene (—CH=CH—), ethylene (—CH$_2$CH$_2$—), carbonyloxy (—COO—) or a covalent bond (—); and R$^2$ and R$^3$ are each independently a straight or branched, saturated or unsaturated hydrocarbon group of up to 10 carbons which may contain one or more ether bonds (—O—) in the chain and wherein one or more H's may be substituted by F;

(b) a tricyclic compound wherein n is 1; p is 0; ring A$^4$ is trans-1,4-cyclohexylene or 2,6-pyrimidine-1,4-diyl, in which the carbon atom in the ring bound to Z$^3$ is defined as 1-position; ring A$^5$ is trans-1,4-cyclohexylene or 1,4-phenylene; ring A$^6$ is trans-1,4-cyclohexylene or 1,4-phenylene which may be substituted by one or more F's; bridge Z$^3$ is ethylene (—CH$_2$CH$_2$—), ethenylene (—CH=CH—), carbonyloxy (—COO—) or a covalent bond (—); bridge Z$^4$ is ethynylene, ethenylene (—CH=CH—), carbonyloxy (—COO—) or a covalent bond (—); and R$^2$ and R$^3$ are each independently a straight or branched, saturated or unsaturated hydrocarbon group of up to 10 carbons which may contain one or more ether bonds (—O—) in the chain and in which one or more H's may be substituted by F; and (c) a tetracyclic compound wherein n and p are 1; rings A$^4$ and A$^5$ are trans-1,4-cyclohexylene; ring A$^6$ is 1,4-phenylene in which the adjacent position to the carbon atom bound to Z$^4$ may be substituted by F; ring A$^7$ is 1,4-phenylene; any of bridges Z$^3$, Z$^4$ and Z$^5$ is a covalent bond (—); and R$^2$ and R$^3$ are independently a straight or branched, saturated or unsaturated hydrocarbon group of up to 10 carbons.

2. The liquid crystal composition of claim 1 which comprises 5–40 wt. % of the first component of formula (1) and 30–95 wt. % of the second component of formula (2) based on the total weight of the liquid crystal composition.

3. The liquid crystal composition of claim 1 which further comprises as the third component at least one selected from the compounds of formula (3)

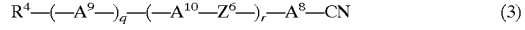

(3)

wherein q and r are independently 0 or 1, and the sum of q+r is at least 1; each of A$^8$, A$^9$ and A$^{10}$ is a 6-membered ring;

$Z^6$ represents a bridge between the rings; and $R^4$ is a straight or branched, saturated or unsaturated hydrocarbon group of up to 10 carbons which may contain one or more ether bonds (—O—); which include (a) a bicyclic compound wherein q is 1; r is 0; ring $A^8$ is 1,4-phenylene; and ring $A^9$ is trans-1,4-cyclohexylene, 1,4-phenylene, 2,6-dioxan-1,4-diyl or 2,6-pyrimidine-1,4-diyl, in which the carbon atom in the ring bound to ring $A^8$ is defined as 1-position;

(b) a tricyclic compound wherein q and r are 1; ring $A^8$ is 1,4-phenylene; ring $A^9$ is trans-1,4-cyclohexylene or 1,4-phenylene; ring $A^{10}$ is trans-1,4-cyclohexylene, 1,4-phenylene or 2,6-pyrimidine-1,4-diyl, in which the carbon atom in the ring bound to bridge $Z^6$ is defined as 1-position; and bridge $Z^6$ is a covalent bond;

(c) a bicyclic or tricyclic compound wherein q is 0 or 1; r is 1; ring $A^8$ is 1,4-phenylene; ring $A^9$ is trans-1,4-cyclohexylene; ring $A^{10}$ is trans-1,4-cyclohexylene or 1,4-phenylene; and bridge $Z^6$ is ethylene (—CH$_2$CH$_2$—), carbonyloxy (—COO—) or a covalent bond (—); and (d) a bicyclic or tricyclic compound wherein q is 0 or 1; r is 1; ring $A^8$ is 1, 4-phenylene in which at least one or both of the adjacent positions to a carbon atom bound to a cyano group are substituted by F; ring $A^9$ is trans-1,4-cyclohexylene; ring $A^{10}$ is trans-1,4-cyclohexylene or 1,4-phenylene which may be substituted by one or more F's; and bridge $Z^6$ is ethylene (—CH$_2$CH$_2$—), carbonyloxy (—COO—) or a covalent bond.

4. The liquid crystal composition of claim 3 which comprises not more than 50 wt. % of the third component of formula (3) based on the total weight of the liquid crystal composition.

5. The liquid crystal composition of claim 3 which further comprises as the fourth component at least one selected from the compounds of formula (4)

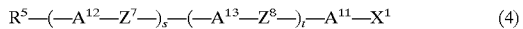 (4)

wherein s and t are independently 0 or 1, and the sum of s+t is at least 1; each of $A^{11}$, $A^{12}$ and $A^{13}$ is a 6-membered ring; each of $Z^7$ and $Z^8$ represents a bridge between the rings; $X^1$ and $R^5$ are the terminal groups; $R^5$ is an alkyl or alkenyl group of up to 10 carbons; which include (a) a bicyclic or tricyclic compound wherein s is 1; t is 0 or 1; ring $A^{11}$ is 1,4-phenylene in which one of the adjacent positions to a carbon atom bound to the terminal group $X^1$ may be substituted by F; ring $A^{12}$ is 2,6-pyrimidine-1,4-diyl, in which the carbon atom in the ring bound to bridge $Z^7$ is defined as 1-position; ring $A^{13}$ is 1,4-phenylene; each of $Z^7$ and $Z^8$ is a covalent bond (—); and the terminal group $X^1$ is F; and (b) a bicyclic or tricyclic compound wherein s is 0 or 1; t is 1; ring $A^{11}$ is 1,4-phenylene in which one or both of the adjacent positions to a carbon atom bound to the terminal group $X^1$ may be substituted by F; ring $A^{12}$ is trans-1,4-cyclohexylene; ring $A^{13}$ is trans-1,4-cyclohexylene or 1,4-phenylene; $Z^7$ and $Z^8$ are independently a carbonyloxy (—COO—) or a covalent bond (—); and the terminal group $X^1$ is F or Cl.

6. The liquid crystal composition of claim 4 which comprises not more than 40 wt. % of the fourth component based on the total weight of the liquid crystal composition.

7. A liquid crystal display element which uses the liquid crystal composition set forth in claim 1.

8. The liquid crystal composition of claim 2, which further comprises as the third component at least one compound selected from the compounds of formula (3)

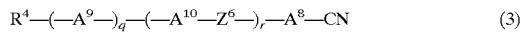 (3)

wherein q and r are independently 0 or 1, and the sum of q+r is at least 1; each of $A^8$, $A^9$ and $A^{10}$ is a 6-membered ring; $Z^6$ represents a bridge between the rings; and $R^4$ is a straight or branched, saturated or unsaturated hydrocarbon group of up to 10 carbons which may contain one or more ether bonds (—O—); which compounds include (a) a bicyclic compound wherein q is 1; r is 0; ring $A^8$ is 1,4-phenylene; and ring $A^9$ is trans-1,4-cyclohexylene, 1,4-phenylene, 2,6-dioxan-1,4-diyl or 2,6-pyrimidine-1,4-diyl, in which the carbon atom in the ring bound to ring $A^8$ is defined as 1-position;

(b) a tricyclic compound wherein q and r are 1; ring $A^8$ is 1,4-phenylene; ring $A^9$ is trans-1,4-cyclohexylene or 1,4-phenylene; ring $A^{10}$ is trans-1,4-cyclohexylene, 1,4-phenylene or 2,6-pyrimidine-1,4-diyl, in which the carbon atom in the ring bound to bridge $Z^6$ is defined as 1-position; and bridge $Z^6$ is a covalent bond;

(c) a bicyclic or tricyclic compound wherein q is 0 or 1; r is 1; ring $A^8$ is 1,4-phenylene, ring $A^9$ is trans-1,4-cyclohexylene; ring $A^{10}$ is trans-1,4-cyclohexylene or 1,4-phenylene; and bridge $Z^6$ is ethylene (—CH$_2$CH$_2$—), carbonyloxy (—COO—) or a covalent bond (—); and (d) a bicyclic or tricyclic compound wherein q is 0 or 1; r is 1; ring $A^8$ is 1,4-phenylene in which at least one or both of the adjacent positions to a carbon atom bound to a cyano group are substituted by F; ring $A^9$ is trans-1,4-cyclohexylene; ring $A^{10}$ is trans-1,4-cyclohexylene or 1,4-phenylene which may be substituted by one or more F atoms; and bridge $Z^6$ is ethylene (—CH$_2$CH$_2$—), carbonyloxy (—COO—) or a covalent bond.

9. The liquid crystal composition of claim 8, which comprises not more than 50 wt. % of the third component of formula (3) based on the total weight of the liquid crystal composition.

10. The liquid crystal composition of claim 8, which further comprises as the fourth component at least one compound selected from the compounds of formula (4)

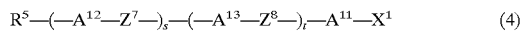 (4)

wherein s and t are independently 0 or 1, and the sum of s+t is at least 1; each of $A^{11}$, $A^{12}$ and $A^{13}$ is a 6-membered ring; each of $Z^7$ and $Z^8$ represents a bridge between the rings; $X^1$ and $R^5$ are the terminal groups; $R^5$ is an alkyl or alkenyl group of up to 10 carbons; which compounds include (a) a bicyclic or tricyclic compound wherein s is 1; t is 0 or 1; ring $A^{11}$ is 1,4-phenylene in which one of the adjacent positions to a carbon atom bound to the terminal group $X^1$ may be substituted by F; ring $A^{12}$ is 2,6-pyrimidine-1,4-diyl, in which the carbon atom in the ring bound to bridge $Z^7$ is defined as 1-position; ring $A^{13}$ is 1,4-phenylene; each of $Z^7$ and $Z^8$ is a covalent bond (—); and the terminal group $X^1$ is F.; and (b) a bicyclic or tricyclic compound wherein s is 0 or 1; t is 1; ring $A^{11}$ is 1,4-phenylene in which one or both of the adjacent positions to a carbon atom bound to the terminal group $X^1$ may be substituted by F; ring $A^{12}$ is trans-1,4-cyclohexylene; ring $A^{13}$ is trans-1 4-cyclohexylene or 1,4-phenylene; $Z^7$ and $Z^8$ are independently a carbonyloxy (—COO—) or a covalent bond (—); and the terminal group $X^1$ is F or Cl.

11. The liquid crystal composition of claim 9, which further comprises as the fourth component at least one compound selected from the compounds of formula (4)

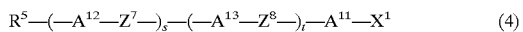   (4)

wherein s and t are independently 0 or 1, and the sum of s+t is at least 1; each of $A^{11}$, $A^{12}$ and $A^{13}$ is a 6-membered ring; each of $Z^7$ and $Z^8$ represents a bridge between the rings; $X^1$ and $R^5$ are the terminal groups; $R^5$ is an alkyl or alkenyl group of up to 10 carbons; which compounds include (a) a bicyclic or tricyclic compound wherein s is 1; t is 0 or 1; ring $A^{11}$ is 1,4-phenylene in which one of the adjacent positions to a carbon atom bound to the terminal group $X^1$ may be substituted by F; ring $A^{12}$ is 2,6-pyrimidine-1,4-diyl, in which the carbon atom in the ring bound to bridge $Z^7$ is defined as 1-position; ring $A^{13}$ is 1,4-phenylene; each of $Z^7$ and $Z^8$ is a covalent bond (—); and the terminal group $X^1$ is F; and (b) a bicyclic or tricyclic compound wherein s is 0 or 1; t is 1; ring $A^{11}$ is 1,4-phenylene in which one or both of the adjacent positions to a carbon atom bound to the terminal group $X^1$ may be substituted by F; ring $A^{12}$ is trans-1,4-cyclohexylene; ring $A^{13}$ is trans-1,4-cyclohexylene or 1,4-phenylene; $Z^7$ and $Z^8$ are independently a carbonyloxy (—COO—) or a covalent bond (—); and the terminal group $X^1$ is F or Cl.

12. The liquid crystal composition of claim 9, which comprises not more than 40 wt % of the fourth component based on the total weight of the liquid crystal composition.

13. The liquid crystal composition of claim 4, which further comprises as the fourth component at least one compound selected from the compounds of formula (4)

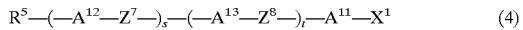   (4)

wherein s and t are independently 0 or 1, and the sum of s+t is at least 1; each of $A^{11}$, $A^{12}$ and $A^{13}$ is a 6-membered ring; each of $Z^7$ and $Z^8$ represents a bridge between the rings; $X^1$ and $R^5$ are the terminal groups; $R^5$ is an alkyl or alkenyl group of up to 10 carbons; which compounds include (a) a bicyclic or tricyclic compound wherein s is 1; t is 0 or 1; ring $A^{11}$ is 1,4-phenylene in which one of the adjacent positions to a carbon atom bound to the terminal group $X^1$ may be substituted by F; ring $A^{12}$ is 2,6-pyrimidine-1,4-diyl, in which the carbon atom in the ring bound to bridge $Z^7$ is defined as 1-position; ring $A^{13}$ is 1,4-phenylene; each of $Z^7$ and $Z^8$ is a covalent bond (—); and the terminal group $X^1$ is F; and (b) a bicyclic or tricyclic compound wherein s is 0 or 1; t is 1; ring $A^{11}$ is 1,4-phenylene in which one or both of the adjacent positions to a carbon atom bound to the terminal group $X^1$ may be substituted by F; ring $A^{12}$ is trans-1,4-cyclohexylene; ring $A^{13}$ is trans-1,4-cyclohexylene or 1,4-phenylene; $Z^7$ and $Z^8$ are independently a carbonyloxy (—COO—) or a covalent bond (—); and the terminal group $X^1$ is F or Cl.

14. The liquid crystal display element of claim 7, wherein said liquid crystal composition comprises 5–40 wt % of the first component of formula (1) and 30–95 wt % of the second component of formula (2) based on the total weight of the liquid crystal composition.

15. The liquid crystal display element of claim 7, wherein said liquid crystal composition further comprises as the third component at least one compound selected from the compounds of formula (3)

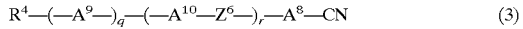   (3)

wherein q and r are independently 0 or 1, and the sum of q+r is at least 1; each of $A^8$, $A^9$ and $A^{10}$ is a 6-membered ring; $Z^6$ represents a bridge between the rings; and $R^4$ is a straight or branched, saturated or unsaturated hydrocarbon group of up to 10 carbons which may contain one or more ether bonds (—O—); which compounds include (a) a bicyclic compound wherein q is 1; r is 0; ring $A^8$ is 1,4-phenylene; and ring $A^9$ is trans-1,4-cyclohexylene, 1,4-phenylene, 2,6-dioxan-1,4-diyl or 2,6-pyrimidine-1,4-diyl, in which the carbon atom in the ring bound to ring $A^8$ is defined as 1-position;

(b) a tricyclic compound wherein q and r are 1; ring $A^8$ is 1,4-phenylene; ring $A^9$ is trans-1,4-cyclohexylene or 1,4-phenylene; ring $A^{10}$ is trans-1,4-cyclohexylene, 1,4-phenylene or 2,6-pyrimidine-1,4-diyl, in which the carbon atom in the ring bound to bridge $Z^6$ is defined as 1-position; and bridge $Z^6$ is a covalent bond;

(c) a bicyclic or tricyclic compound wherein q is 0 or 1; r is 1; ring $A^8$ is 1,4-phenylene, ring $A^9$ is trans-1,4-cyclohexylene; ring $A^{10}$ is trans-1,4-cyclohexylene or 1,4-phenylene; and bridge $Z^6$ is ethylene (—CH$_2$CH$_2$—), carbonyloxy (—COO—) or a covalent bond (—); and (d) a bicyclic or tricyclic compound wherein q is 0 or 1; r is 1; ring $A^8$ is 1,4-phenylene in which at least one or both of the adjacent positions to a carbon atom bound to a cyano group are substituted by F; ring $A^9$ is trans-1,4-cyclohexylene; ring $A^{10}$ is trans-1,4-cyclohexylene or 1,4-phenylene which may be substituted by one or more F atoms; and bridge $Z^6$ is ethylene (—CH$_2$CH$_2$—), carbonyloxy (—COO—) or a covalent bond.

16. The liquid crystal display element of claim 15, wherein said liquid crystal composition comprises not more than 50 wt % of the third component of formula (3) based on the total weight of the liquid crystal composition.

17. The liquid crystal display element of claim 16, wherein said liquid crystal composition further comprises as the fourth component at least one compound selected from the compounds of formula (4)

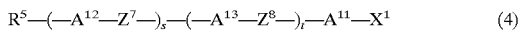   (4)

wherein s and t are independently 0 or 1, and the sum of s+t is at least 1; each of $A^{11}$, $A^{12}$ and $A^{13}$ is a 6-membered ring; each of $Z^7$ and $Z^8$ represents a bridge between the rings; $X^1$ and $R^5$ are the terminal groups; $R^5$ is an alkyl or alkenyl group of up to 10 carbons; which compounds include (a) a bicyclic or tricyclic compound wherein s is 1; t is 0 or 1; ring $A^{11}$ is 1,4-phenylene in which one of the adjacent positions to a carbon atom bound to the terminal group $X^1$ may be substituted by F; ring $A^{12}$ is 2,6-pyrimidine-1,4-diyl, in which the carbon atom in the ring bound to bridge $Z^7$ is defined as 1-position; ring $A^{13}$ is 1,4-phenylene; each of $Z^7$ and $Z^8$ is a covalent bond (—); and the terminal group $X^1$ is F; and (b) a bicyclic or tricyclic compound wherein s is 0 or 1; t is 1; ring $A^{11}$ is 1,4-phenylene in which one or both of the adjacent positions to a carbon atom bound to the terminal group $X^1$ may be substituted by F; ring $A^{12}$ is trans-1,4-cyclohexylene; ring $A^{13}$ is trans-1 4-cyclohexylene or 1,4-phenylene; $Z^7$ and $Z^8$ are independently a carbonyloxy (—COO—) or a covalent bond (—); and the terminal group $X^1$ is F or Cl.

18. The liquid crystal display element of claim 16, wherein said liquid crystal composition comprises not more than 40 wt % of the fourth component based on the total weight of the liquid crystal composition.

19. The liquid crystal display element of claim 14, wherein said liquid crystal composition further comprises as the third component at least one compound selected from the compounds of formula (3)

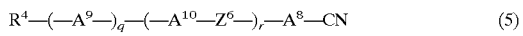

wherein q and r are independently 0 or 1, and the sum of q+r is at least 1; each of $A^8$, $A^9$ and $A^{10}$ is a 6-membered ring; $Z^6$ represents a bridge between the rings; and $R^4$ is a straight or branched, saturated or unsaturated hydrocarbon group of up to 10 carbons which may contain one or more ether bonds (—O—); which compounds include (a) a bicyclic compound wherein q is 1; r is 0; ring $A^8$ is 1,4-phenylene; and ring $A^9$ is trans-1,4-cyclohexylene, 1,4-phenylene, 2,6-dioxan-1,4-diyl or 2,6-pyrimidine-1,4-diyl, in which the carbon atom in the ring bound to ring $A^8$ is defined as 1-position;

(b) a tricyclic compound wherein q and r are 1; ring $A^8$ is 1,4-phenylene; ring $A^9$ is trans-1,4-cyclohexylene or 1,4-phenylene; ring $A^{10}$ is trans-1,4-cyclohexylene, 1,4-phenylene or 2,6-pyrimidine-1,4-diyl, in which the carbon atom in the ring bound to bridge $Z^6$ is defined as 1-position; and bridge $Z^6$ is a covalent bond;

(c) a bicyclic or tricyclic compound wherein q is 0 or 1; r is 1; ring $A^8$ is 1,4-phenylene, ring $A^9$ is trans-1,4-cyclohexylene; ring $A^{10}$ is trans-1,4-cyclohexylene or 1,4-phenylene; and bridge $Z^6$ is ethylene (—CH$_2$CH$_2$—), carbonyloxy (—COO—) or a covalent bond (—); and (d) a bicyclic or tricyclic compound wherein q is 0 or 1; r is 1; ring $A^8$ is 1,4-phenylene in which at least one or both of the adjacent positions to a carbon atom bound to a cyano group are substituted by F; ring $A^9$ is trans-1,4-cyclohexylene; ring $A^{10}$ is trans-1,4-cyclohexylene or 1,4-phenylene which may be substituted by one or more F atoms; and bridge $Z^6$ is ethylene (—CH$_2$CH$_2$—), carbonyloxy (—COO—) or a covalent bond.

20. The liquid crystal display element of claim 19, wherein said liquid crystal composition comprises not more than 50 wt. % of the third component of formula (3) based on the total weight of the liquid crystal composition.

21. The composition as claimed in claim 1, wherein the first component is a compound of formula (1)(a).

22. The composition as claimed in claim 1, wherein the first component is a compound of formula (1)(b).

23. A composition as claimed in claim 1, wherein the first component is a compound of formula (2)(a).

24. The composition as claimed in claim 1, wherein the first component is a compound of formula (2)(b).

25. A composition as claimed in claim 1, wherein the first component is a compound of formula (2)(c).

* * * * *